H. B. ROE.
COVER FOR ELECTRIC SWITCH BOXES.
APPLICATION FILED DEC. 13, 1909.
1,038,963.
Patented Sept. 17, 1912.
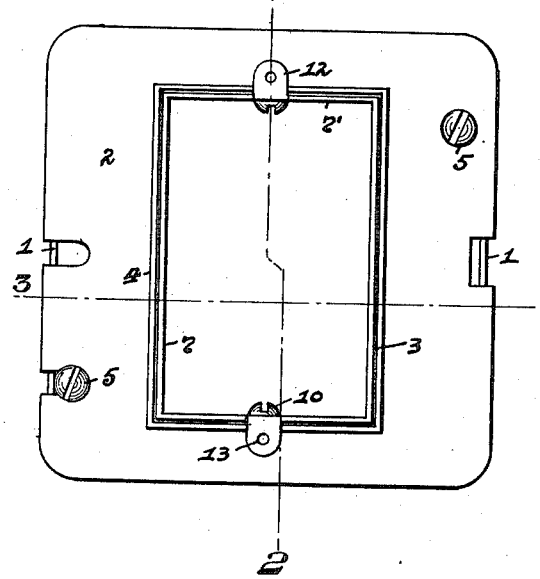
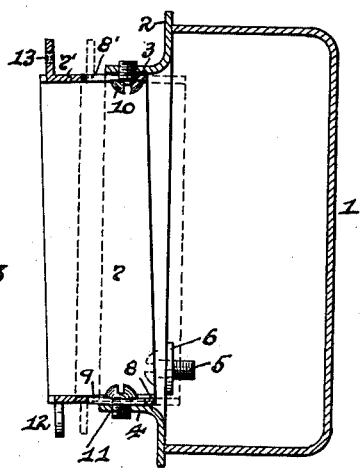
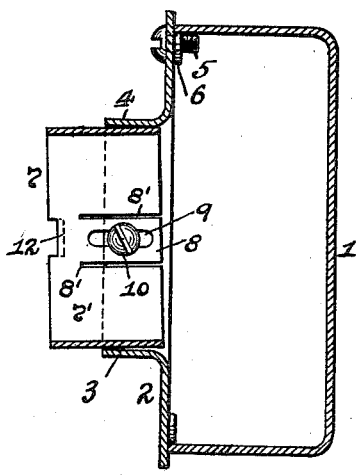
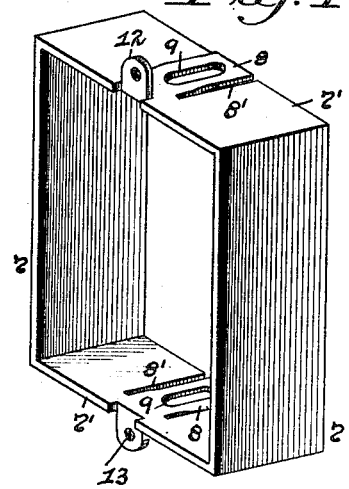
WITNESSES
O. L. Thompson.
Alex. Scott
INVENTOR
Howard B. Roe.
By J. N. Cooke
Attorney.

UNITED STATES PATENT OFFICE.

HOWARD B. ROE, OF PITTSBURGH, PENNSYLVANIA.

COVER FOR ELECTRIC SWITCH-BOXES.

1,038,963.  Specification of Letters Patent.  Patented Sept. 17, 1912.

Application filed December 13, 1909. Serial No. 532,748.

*To all whom it may concern:*

Be it known that I, HOWARD B. ROE, a resident of Pittsburgh, (North Side,) in the county of Allegheny and State of Pennsylvania, have invented a new and useful Improvement in Covers for Electric Switch-Boxes; and I do hereby declare the following to be a full, clear, and exact description thereof.

My invention relates to covers for electric switch boxes, and has special reference to what are known as "flush" switch boxes.

The object of my invention is to provide a cheap, simple and efficient cover for flush switch boxes which can be made adjustable so as to enable the same to be placed at the position desired for forming a flush connection with the wall or other place on which it is used, and will form a rigid and binding connection when set in place.

My invention consists, generally stated, in the novel arrangement, construction and combination of parts, as hereinafter more specifically set forth and described and particularly pointed out in the claims.

To enable others skilled in the art to which my invention appertains to construct and use my improved cover for flush switch boxes, I will describe the same more fully, referring to the accompanying drawing, in which—

Figure 1 is a front elevation of a flush switch box employing my invention. Fig. 2 is a cross-section of the same on the line 2—2 Fig. 1. Fig. 3 is a like section on the line 3—3 Fig. 1. Fig. 4 is a perspective view of the throat or sleeve member employed.

Like symbols of reference herein indicate like parts in each of the figures of the drawing.

As illustrated in the drawing, 1 represents the box, which is generally formed of metal, such as steel, and into square shape, preferably by stamping or pressing, and fitting over said box is the cover 2 of the same shape and material and preferably formed in the same manner. This cover 2 is provided with an opening 3 centrally through the same, which is preferably of oblong shape, and has a flange or rim 4 extending outwardly around the same. The cover 2 extends beyond the sides of the box 1, and is secured to such box by means of screws 5 passing through the same and through lugs or ears 6, which are formed on the sides of the box and extend into the interior of the same.

Fitting within the opening 3 in the box 2 is the throat or sleeve member 7, which is formed of the same material and in the same manner as the box 1 and cover 2 and is preferably of the same oblong shape as said opening. This sleeve 7 has a spring portion 8 formed in each of its ends 7' by slitting or cutting such ends for a portion of their depth from the inner edge of the same, as at 8', and within each of said spring portions is an elongated opening or slot 9 for screws 10 to engage with holes 11 in the rim 4, as hereinafter described. Lugs or ears 12 are formed on each of the ends 7' on the sleeve 7, which extend outwardly from the outer edge of said sleeve and above the spring portions 8 for the attaching of the switch (not shown) to the device in the usual manner by screws on the switch passing through threaded holes 13 in said ears.

When the box 1 is in position in the wall or other place in which it is to be used, and the cover 2 is secured in place thereon by the screws 5 passing through the same and engaging with the ears 6 on said box, the sleeve 7 can then be placed within the opening 3 in said cover and when adjusted to position so that the outer edge of the same is in line with the wall, the screws 10 are passed through the slots 9 in the spring portions 8 on said sleeve and screwed to place within the threaded holes 11 in the rim 4 of the cover surrounding said opening and sleeve. After this is done, the usual switch is placed within the sleeve 7 and secured to the ears 12 as above described, and then the face plate can be placed over the sleeve 7 and switch and secured to the switch in the usual manner.

It will be obvious that when my improved cover for electric switch boxes is in place, the sleeve 7 employed therewith can be adjusted to any position desired by tilting the same on the screws 10 passing through the slots 9 in the spring portions 8 of the same and engaging with the rim 4 on the cover and then screwing up said screws to hold the sleeve in place. One position of such cover is shown in Fig. 3, in which the adjustable sleeve 7 is tilted on its sides in the cover, by swinging the same on the screws 10, which will act as a pivot in such case; and another position is shown in Fig. 2, in which such sleeve is slid along said screws to tilt the same on its ends, in which case the spring portions 8 on the sleeve will bind against the rim 4 on the cover 2, and thereby assist in holding the sleeve in place.

It will be evident that the box and my improved cover for the same can be formed of any suitable material and in any suitable manner, and that the shape of the same may be varied, while such cover can be used on what is known as "gang" switch boxes or for interior electric conduit boxes commonly known as "outlet" boxes, and for other similar boxes. Various modifications and changes in the design and construction of the various parts of my improved cover may be resorted to without departing from the spirit of the invention as defined in the claims or sacrificing any of its advantages.

It will thus be seen that my improved cover for electric switch and other similar boxes will enable an easy, rapid and convenient setting of the cover in proper position with relation to the wall or other place in which the box is used, so as to form a neat and finished appearance to the work and for the placing of the switch and face-plate thereon, and such cover will also permit of easy and free movement for adjustment at all times when placed within the box and when once set in position will be held rigidly and securely for the finishing of the work in connection with the same. By reason of the screws being operated on the inside of the sleeve in adjusting the cover it will overcome the plaster around the box from being dug out from around the ordinary screws by the workmen, as in ordinary construction.

The device will also enable the use of both shallow and deep covers on the boxes, as when the sleeve member is at its most inward position on the box it will act as a shallow cover or when drawn out to its complete outward position it will form a deep cover, thereby rendering the cover of efficient use when two boxes are placed back to back against each other in shallow walls.

What I claim as my invention and desire to secure by Letters Patent is—

1. An electric switch box cover having an opening therein, and a slidable sleeve fitting in said opening and having outwardly extending spring portions within the same, and means between said cover and said spring portions to permit the adjustment of said sleeve.

2. An electric switch box cover having an opening therein, a sleeve fitting in said opening having spring portions provided with a slot therein, and means passing through said slots and engaging with said cover to permit the adjustment of said sleeve.

3. An electric switch box cover having an opening therein provided with a surrounding flange, a sleeve fitting in said opening having spring portions provided with a slot therein, and means passing through said slots and engaging with said flange to permit the adjustment of said sleeve.

4. An electric switch box cover having an opening therein provided with a surrounding flange, a sleeve fitting in said opening having spring portions provided with a slot therein, and a screw passing through said slots and engaging with said flange and sleeve to permit the adjustment of said sleeve and hold the same in place.

In testimony whereof, I, the said HOWARD B. ROE, have hereunto set my hand.

HOWARD B. ROE.

Witnesses:
GERTRUDE KREMER,
J. N. COOKE.